United States Patent
Maiti et al.

(10) Patent No.: US 12,231,532 B1
(45) Date of Patent: Feb. 18, 2025

(54) SCALABLE TWEAK ENGINES AND PREFETCHED TWEAK VALUES FOR ENCYRPTION ENGINES

(71) Applicant: XILINX, INC., San Jose, CA (US)

(72) Inventors: Devanjan Maiti, Bengaluru (IN); Robert Bellarmin Susai, Hyderanad (IN); Jayaram Pvss, Hyderabad (IN)

(73) Assignee: XILINX, INC., San Jose, CA (US)

( * ) Notice: Subject to any disclaimer, the term of this patent is extended or adjusted under 35 U.S.C. 154(b) by 397 days.

(21) Appl. No.: 16/831,356

(22) Filed: Mar. 26, 2020

(51) Int. Cl.
 *H04L 9/06* (2006.01)
 *G06F 9/30* (2018.01)
 *G06F 13/28* (2006.01)
 *H04L 9/08* (2006.01)

(52) U.S. Cl.
 CPC ........ *H04L 9/0618* (2013.01); *G06F 9/30047* (2013.01); *G06F 9/30101* (2013.01); *G06F 13/287* (2013.01); *H04L 9/0819* (2013.01); *H04L 9/0894* (2013.01)

(58) Field of Classification Search
 CPC ... H04L 9/0618; H04L 9/0819; H04L 9/0894; G06F 9/30047; G06F 9/30101; G06F 13/287
 See application file for complete search history.

(56) References Cited

U.S. PATENT DOCUMENTS

| | | | |
|---|---|---|---|
| 9,092,644 B2 | 7/2015 | Narendra Trivedi et al. | |
| 9,252,943 B1* | 2/2016 | Hars | G06F 12/1408 |
| 9,363,078 B2 | 6/2016 | Taylor et al. | |
| 9,614,666 B2 | 4/2017 | Kishinevsky et al. | |
| 2009/0060197 A1* | 3/2009 | Taylor | H04L 9/0618 380/277 |
| 2010/0023748 A1* | 1/2010 | Tang | H04L 9/065 714/48 |
| 2012/0328097 A1* | 12/2012 | Sheikh | H04L 9/0637 380/44 |
| 2015/0169472 A1* | 6/2015 | Yap | G06F 12/1408 713/190 |
| 2016/0364343 A1* | 12/2016 | Case | H04L 9/0637 |
| 2017/0054550 A1* | 2/2017 | Choi | H04L 9/0637 |
| 2017/0083341 A1* | 3/2017 | Burger | G06F 9/3859 |
| 2018/0091308 A1* | 3/2018 | Durham | H04L 9/0894 |
| 2019/0004973 A1* | 1/2019 | Chhabra | G06F 12/1408 |
| 2019/0102577 A1 | 4/2019 | Gueron et al. | |
| 2019/0220349 A1* | 7/2019 | Deutsch | G06F 11/1064 |
| 2019/0294821 A1* | 9/2019 | Roake | H04L 9/0631 |

* cited by examiner

*Primary Examiner* — Alexander Lagor
*Assistant Examiner* — Zoha Piyadehghibi Tafaghodi
(74) *Attorney, Agent, or Firm* — Patterson + Sheridan, LLP

(57) ABSTRACT

Examples herein describe a scalable tweak engine and prefetching tweak values. Regarding the scalable tweak engine, it can be designed to accommodate different bus widths of data. The scalable tweak engine described herein includes multiple tweak calculators that can be daisy chained together to output multiple tweak values every clock cycle. These tweak values can be sent to multiple encryption cores so that multiple data blocks can be encrypted in parallel. Regarding prefetching tweak values, previous encryption engines incur a delay as the tweak value (e.g., a metadata value) for a data block is calculated. In the embodiments herein, the encryption engine can include an independent metadata engine that determines the metadata value for a subsequent data block while the current data block is being encrypted.

20 Claims, 6 Drawing Sheets

SCALABLE TWEAK ENGINES AND PREFETCHED TWEAK VALUES FOR ENCYRPTION ENGINES

TECHNICAL FIELD

Examples of the present disclosure generally relate to scalable tweak engines and prefetching tweak values in encryption engines.

BACKGROUND

Data center storage is evolving at a rapid pace and encryption is an important feature of many storage applications. The emergence of newer storage technologies, such as NVMe and 3D-Xpoint, demand system components that provide significantly better performance so that data encryption does not become a bottleneck in the design. Encryption engines currently available in the market do not meet these performance requirements. There is a tremendous demand for high performance encryption cores that can be integrated into storage systems.

The Advanced Encryption Standard (AES) (FIPS PUB 197) is a National Institute of Standards and Technology (NIST) Federal Information Processing Standard (FIPS) approved cryptographic algorithm that can encrypt and decrypt data in blocks of 128 bits. The XOR-Encrypt-XOR (XEX) encryption includes an XEX with Tweak and ciphertext Stealing (XTS) Mode of AES that is the Institute of Electrical and Electronics Engineers (IEEE) Standard for Cryptographic Protection of Data on Block-Oriented Storage Devices (IEEE Std 1619™-2018) such as solid-state drives. AES-XTS Mode involves the generation of an additional primitive element of GF (2^128); also known as a "tweak value" for every 128-bit block within one data unit. The very first tweak value is given as an input in the beginning as an Initialization Vector (IV). The subsequent tweak values are generated from this IV.

Current XTS implementations process only one block at a time limiting the maximum achievable throughput to what one encryption engine can achieve. It is difficult, if not possible, to cascade or use multiple such engines in parallel to achieve better throughput since the output would not be compliant to the XTS standard.

SUMMARY

Techniques for performing encryption are described. One example is an integrated circuit that includes a tweak engine configured to generate a tweak value based on a initialization vector (IV). The tweak engine includes a first tweak calculator configured to generate a first tweak value where an input of the first tweak calculator is configured to selectively receive one of the IV and an output of a previously calculated tweak value and a second tweak calculator configured to generate a second tweak value where an input of the second tweak calculator is coupled to an output of the first tweak calculator. The integrated circuit also includes a first encryption core configured to receive the first tweak value and a second encryption core configured to receive the second tweak value.

One example described herein is a method that includes receiving a signal indicating a width of a data bus transmitting data to an encryption engine, determining a number of tweak calculators in a tweak engine in the encryption engine based on the signal where the number of a tweak calculators is based on the width of the data bus, and generating tweak values using the tweak calculators for encrypting data received on the data bus.

One example described herein is an integrated circuit that includes a tweak engine configured to generate tweak values for encrypting received data blocks, an encryption core configured to encrypt the received data blocks using the tweak values where the tweak engine is configured to pre-fetch a key corresponding to a second data block by generating a first tweak value corresponding to a first data block, after determining the first data block has been received, indicating that the tweak engine is ready for the key, receiving the key before the encryption core has finished encrypting the first data block, and generating a second tweak value for the second data block.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 7A and 7B are timing charts illustrating handshakes for prefetching tweak values, according to examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
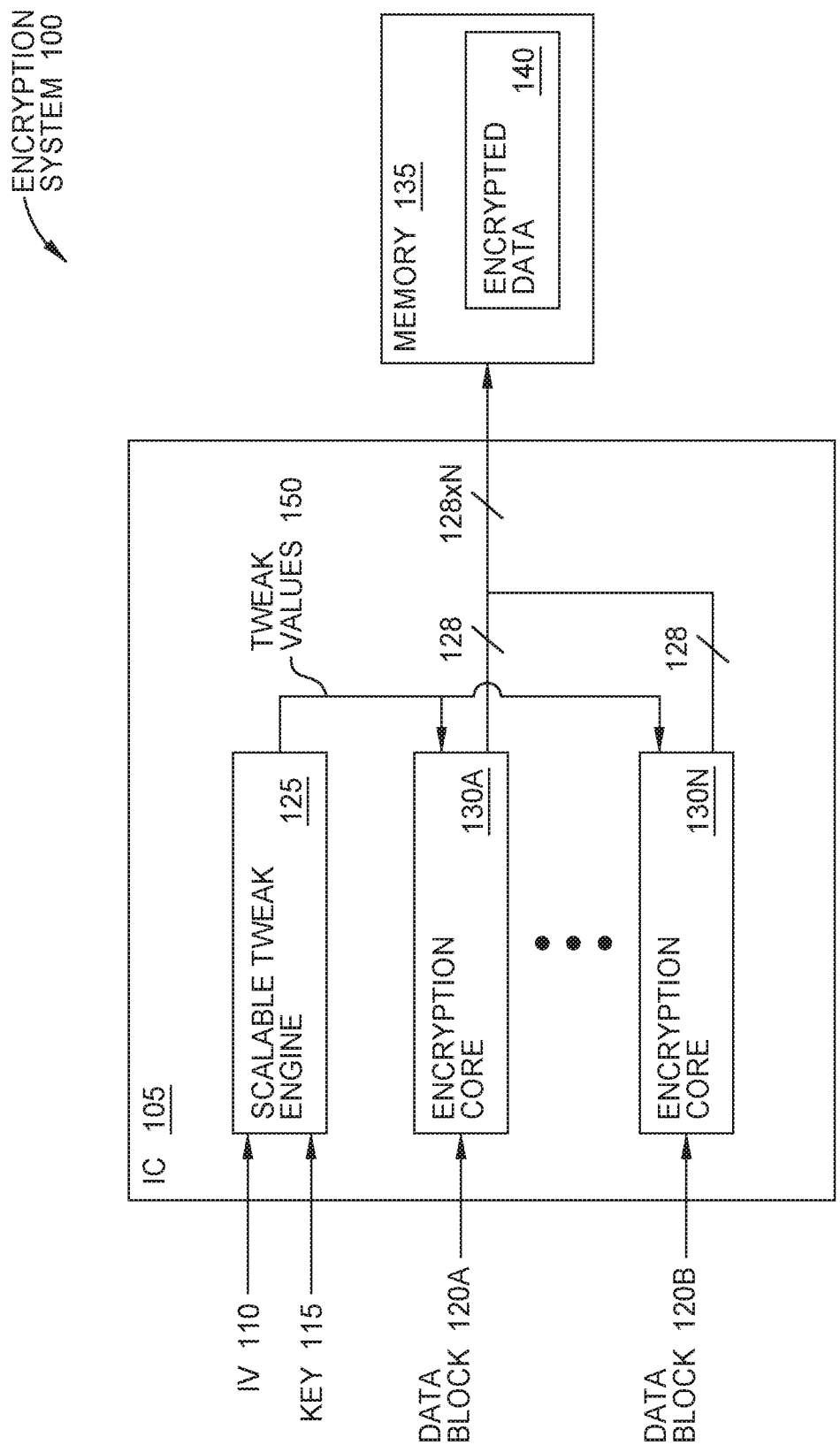
FIG. 1 is a block diagram of an encryption engine with a scalable tweak engine, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe a scalable tweak engine and prefetching tweak values. Regarding the scalable tweak engine, it can be designed to accommodate different bus widths of data. For example, a communication protocol (e.g., Advanced extensible Interface (AXIS) streaming) can support a configurable bus—e.g., 128 bit, 256 bit, 512 bit, etc. When performing AES-XTS encryption, a 512-bit bus can transmit four 128-bit data blocks in parallel. As mentioned above, the encryption engine generates a tweak value for each of the those 128-bit blocks. The scalable tweak engine described herein includes multiple tweak calculators that can be daisy chained together to output multiple tweak values every clock cycle. As a result, the tweak calculators can each generate an updated tweak value each clock cycle.

These tweak values can be sent to multiple encryption cores so that multiple 128-bit data blocks can be encrypted in parallel. Thus, if the user chooses a bus width that permits the encryption engine to receive multiple 128-bit data blocks in parallel, the tweak engine can scale to provide a corresponding number of tweak values each clock cycle. Stated differently, the scalable tweak engine generates of multiple primitive elements (e.g., tweak values) in a single clock cycle thus enabling parallel block encryption. This in turn enables interfaces broader than 128 bits (without additional delay for calculating the tweak values) thereby enhancing the performance to meet the requirements of the modern data center and remain complaint with the XTS standard.

Regarding prefetching tweak values, previous encryption engines incur a delay as the tweak value for a data block is calculated. That is, before a data block is encrypted, AES-XTS requires the tweak value to first be calculated. This delay limits performance. In the embodiments below, the encryption engine can include an independent tweak engine that determines the tweak value for a subsequent data block while the current data block is being encrypted. That is, because the data used to generate the tweak values for the subsequent data block is often available before the current data block has finished being encrypted, the tweak engine can prefetch the data and generate the tweak value for the subsequent data block while the current data block is being encrypted. Thus, when the subsequent data block is received, the encryption engine may have finished calculating its corresponding tweak value so that the encryption engine can immediately begin to encrypt the data block. In this manner, the delay for calculating the tweak values can be eliminated (or at least mitigated).

FIG. 1 is a block diagram of an encryption system 100 with a scalable tweak engine 125, according to an example. As shown, the encryption system 100 includes an integrated circuit (IC) 105 and a memory 135. The IC 105 can be implemented as a processor formed using programmable logic, an accelerator (e.g., a field programmable gate array (FPGA)), or an application specific integrated circuit (ASIC).

As shown, the IC 105 receives an IV 110, a key 115, and data blocks 120A and 120B from a user application (not shown). For example, the user application may send this information as part of an encryption task. While the embodiments below are discussed in context of AES-XTS mode encryption, they are not limited to this encryption technique. The embodiments herein can be used with any encryption that uses a tweak value (or a similar concept) to encrypt data blocks 120.

The IC 105 includes the scalable tweak engine 125 and multiple encryption cores 130. In one embodiment, the IC 105 includes as many encryption cores 130 are there are data blocks being received at the IC 105 at the same time. For example, if the bus connected to the IC 105 (or the interface of the IC 105) receives four data blocks 120 at the same time (e.g., in parallel), the IC 105 can include four encryption cores 130 that encrypt the four data blocks (e.g., four 128-bit data blocks) in parallel. In FIG. 1, N represents the number of data blocks the IC 105 receives at the same time.

However, for the encryption cores 130 to encrypt the data blocks 120 in parallel, the encryption cores 130 need their own tweak values 150. That is, if the tweak engine 125 generates the tweak values 150 in parallel, then the encryption cores 130 can encrypt the data blocks 120 in parallel. Thus, in one embodiment, the tweak engine 125 can generate tweak values 150 in parallel and transmit the tweak values 150 to respective ones of the encryption cores 130.

The encryption cores 130 output 128 bits of encrypted data which can then be transmitted and stored in the memory 135 as encrypted data 140. The memory 135 can include volatile memory elements, non-volatile memory elements, and combinations thereof. In one embodiment, the memory 135 is part of a data center—e.g., a cloud-based data storage application. However, while the memory 135 is shown as being external to the IC 105, in other embodiments, the memory 135 may be in the IC 105.

Figure 2:
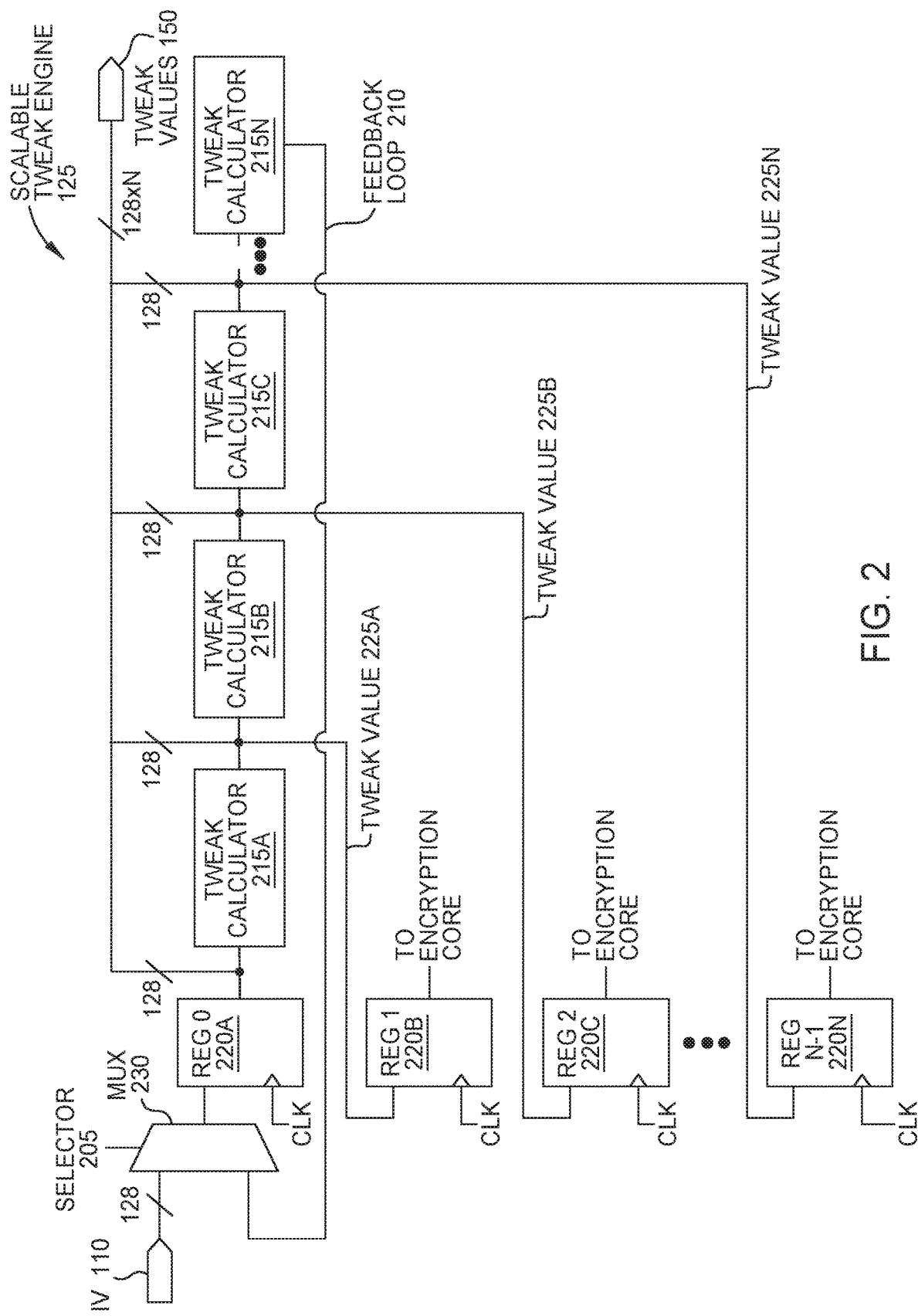
FIG. 2 is a schematic of a scalable tweak engine, according to an example.

FIG. 2 is a schematic of the scalable tweak engine 125, according to an example. As shown at the top left, the tweak engine 125 receives the original IV 110 (which may be supplied by the user application initiating the encryption task) when the encryption task first begins. That is, the IV 110 can be thought of as a seed for starting the encryption process. The tweak engine 125 may also receive keys for generating the tweak values, but this is not shown in FIG. 2. The scalable tweak engine 125 includes a multiplexer (mux) 230 controlled by a selector signal 205. If this encryption task has just begun, the selector signal 205 instructs the mux 230 to output the IV 110 to a first register 220A.

The output of the first register 220A is coupled to a first tweak calculator 215A. Further, the output of the first register 220A also outputs a 128-bit tweak value that serves as the tweak value for the first data block. If the encryption task has just begun, the tweak engine 125 uses the IV 110 received from the user application as the first tweak value.

The first tweak calculator 215A receives the tweak value outputted by the register 220A and generates a second tweak value for a second data block. The tweak calculators 215 are not limited to any particular technique for generating the different tweak values 150. That is, the tweak engine 125 can be used with any algorithm used by the tweak calculators 215 (or more generally, a metadata engine) to generate the tweak values for the different data blocks being encrypted.

A second tweak calculator 215B receives the second tweak value generated by the first tweak calculator 215A and generates a third tweak value for the third data block. Similarly, a third tweak calculator 215C receives the third tweak value generated by the second tweak calculator 215B and generates a fourth tweak value for the fourth data block. Finally, a fourth tweak calculator 215N receives the fourth tweak value generated by the third tweak calculator 215C and generates a fifth tweak value for the fifth data block. The first, second, third, and fourth tweak values (which are outputted by the first register 220A, the first tweak calculator 215A, the second tweak calculator 215B, and the third tweak calculator 215C, respectively) are combined as the tweak values 150 (e.g., placed on a 512-bit bus) and transmitted in parallel to the encryption cores (not shown).

In AES-XTS encryption, the data blocks being encrypted are merged with the tweak values twice: once before the data blocks are encrypted by the encryption cores and again after the data blocks have been encrypted. Thus, the port at the upper right of the scalable tweak engine 125 outputs the tweak values 150 so that these values 150 can be merged with their respective data blocks before the data blocks are encrypted. To do so, the first register 220A and the tweak calculators 215A-C can generate the tweak values 150 in one clock cycle. That is, the first register 220A can output its stored tweak value (which is the same as the IV 110 when the encryption task first begins) and the circuitry in the tweak calculators 215A-C can derive their respective tweak value based on the output of the register 220A in one clock cycle. Stated differently, there is no storage element (e.g., a register) between the output of one tweak calculator and the input of the subsequent tweak calculator. Thus, each clock cycle, the tweak values 150 can include four different tweak values for four consecutive data blocks.

However, as shown, the output of the fourth tweak calculator 215N is not part of the tweak values 150 that is outputted to the encryption engine. Instead, the tweak engine 125 includes a feedback loop 210 for transmitting the fifth tweak value generated by the tweak calculator 215N to the input of the mux 230. After the first computation cycle (where the IV 110 is used to initialize the tweak engine 125 and serves as the first tweak value), the selector signal 205 instructs the mux 230 to transmit the output of the tweak calculator 215N (i.e., the fifth tweak value) to the register 220A. Stated differently, during the first computation cycle of the encryption task, the mux 230 forwards the IV 110 received from the user application, but during all subsequent computation cycles the tweak engine 125 generates tweak values for the same encryption task the mux 230 forwards the output of the tweak calculator 215N to the register 220A. In this manner, the output of the tweak calculator 215N generates the first tweak value for the next set of blocks received at the encryption engine (i.e., the first tweak value for the next set of data blocks received on the bus).

Stated differently, in any particular clock cycle, the tweak engine generates one extra tweak value. For example in case of 4 parallel encryption cores, in the very first cycle the IV itself along with three more generated tweak values are fed to the encryption engine. But a fourth tweak is also generated in the same cycle, which goes to the MUX (selector) and gets registered as the first tweak value for the next cycle.

In addition to transmitting the four tweak values 150 to the encryption cores, the tweak engine 125 saves these values in the registers 220A-D. That is, the first tweak value is stored in the register 220A, the second tweak value is saved in register 220B, and so forth. As mentioned above, the tweak values may be merged twice with the received data blocks: once before the data blocks are encrypted and again after they are encrypted. By saving the tweak values in the registers 220, they can be preserved until encryption is complete and the tweak values are ready to be merged with the encrypted data blocks the second time. Thus, the outputs of the registers 220 can be connected to the encryption core.

In other embodiments, instead of storing the tweak values in registers in the tweak engine 125, the encryption cores can include respective registers for storing the tweak values 150, in which case the registers 220B-220D may be omitted (although the register 220A may still be used to store the fifth tweak value so it can be used to generate the next tweak values for the subsequently received set of data blocks).

Figure 3:
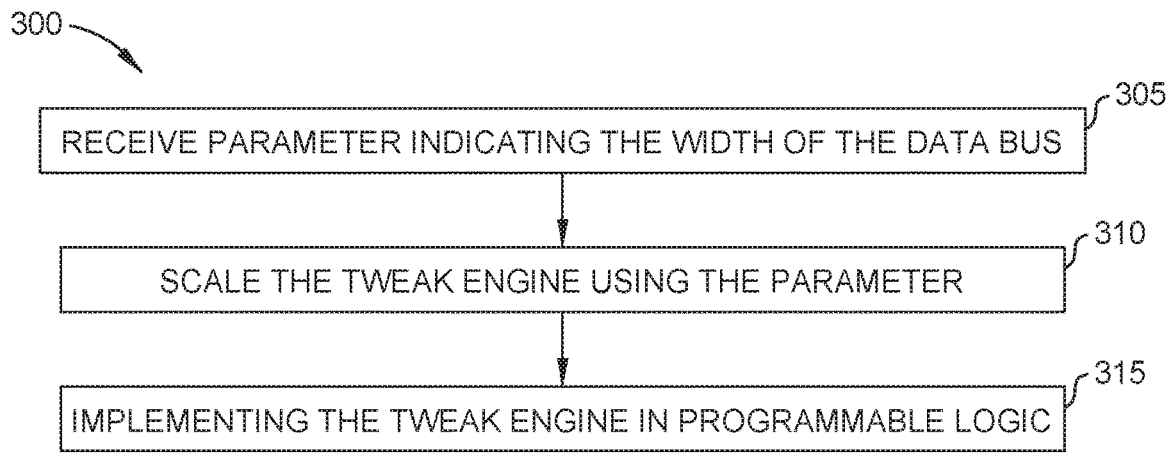
FIG. 3 is a flowchart for implementing a scalable tweak engine in programmable logic, according to an example.

FIG. 3 is a flowchart of a method 300 for implementing a scalable tweak engine in programmable logic (PL), according to an example. That is, the method 300 can be used to scale a tweak engine which is implemented in PL within an IC (e.g., an FPGA or a SoC containing PL).

At block 305, a synthesizer tasked with configuring the PL in the IC receives a parameter (e.g., a signal) indicating the width of the data bus used to transmit data block to the encryption engine. Using the example above, the width may indicate the number (N) of 128-bit blocks that are transmitted in parallel on the data bus. In one embodiment, the synthesizer generates N number of encryption cores so that the N number of 128-bit blocks can be encrypted in parallel by the N number of cores.

At block 310, the synthesizer scales the tweak engine using the parameter. If N is 4, then the synthesizer generates a tweak engine with the same components as the tweak engine 125 in FIG. 2. However, if N is two, the synthesizer generates a tweak engine that outputs two tweak values each clock cycle. In that example, the tweak engine could omit the tweak calculators 215C and 215N and the registers 220C and 220N. The output of the tweak calculator 215B would be used as a feedback loop to the input of the mux 230 and the outputs of the register 220A and the tweak calculator 215A would form the tweak values 150. If N is one, the synthesizer scales the tweak engine to include the tweak calculator 215A but can omit the tweak calculators 215B-N and the registers 220B-N. In this manner, the parameter received at block 305 determines the scale of the tweak engine.

At block 315, the synthesizer implements the tweak engine in PL. In one embodiment, the synthesizer can generate register transfer level (RTL) data that defines the design of the tweak engine which is then converted to a bitstream and transferred to the PL. The RTL data configures the PL to execute the tweak engine.

In one embodiment, the user may wish to reconfigure the tweak engine to accommodate a different bus width. In that case, the synthesizer can repeat blocks 310 and 315 to reconfigure the PL in the IC to include a different sized tweak engine. In this manner, the tweak engine can be scaled to accommodate different sized buses.

Figure 4:
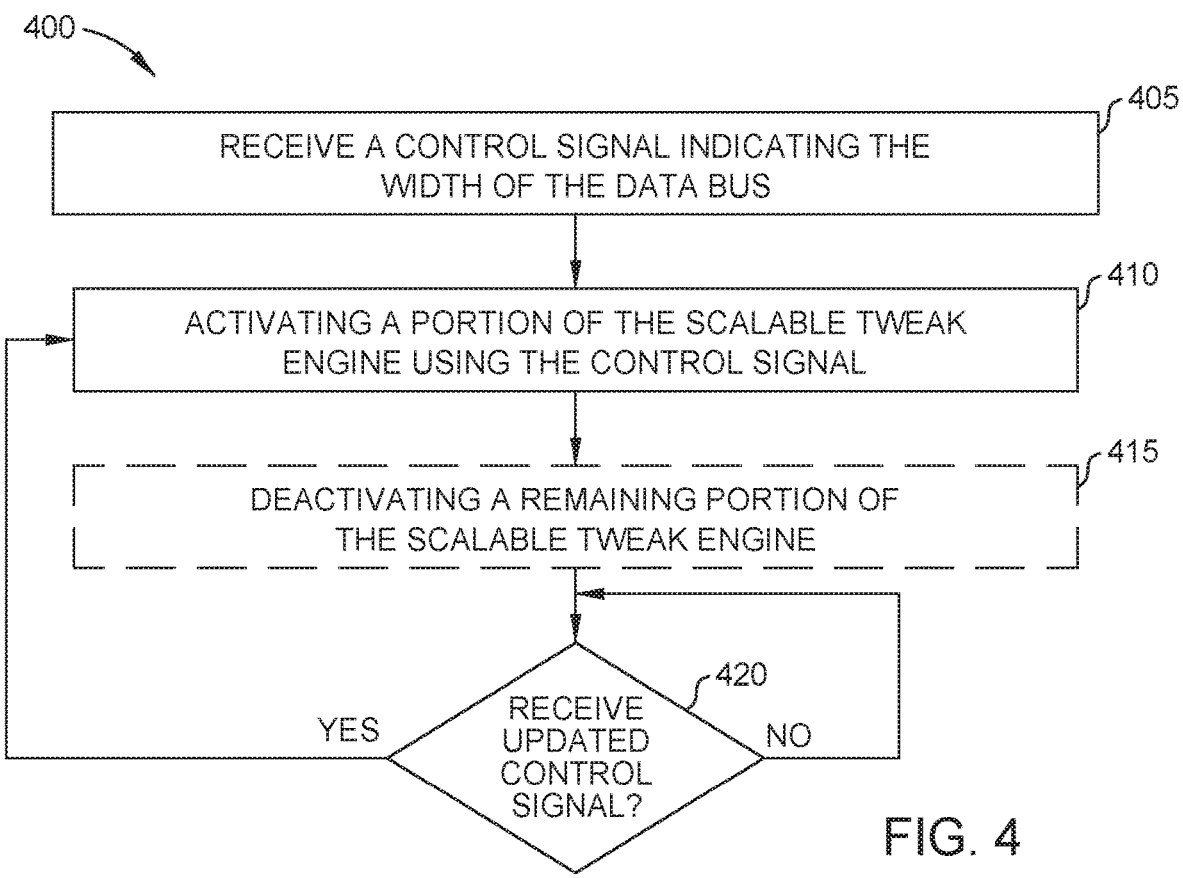
FIG. 4 is a flowchart for implementing a scalable tweak engine in hardened logic, according to an example.

FIG. 4 is a flowchart of a method 400 for implementing a scalable tweak engine in hardened logic, according to an example. In this embodiment, the tweak engine can be changed on the fly (i.e., dynamically) to accommodate changes to the amount of data blocks being received. Unlike in method 400 where the PL can be reconfigured to scale the tweak engine, in this embodiment the tweak engine is formed from hardened circuitry. Nonetheless, the tweak engine can be reconfigured to accommodate different bus widths, but without changing the underlying hardware.

At block 405, the encryption engine receives a control signal indicating the width of the data bus transmitting data blocks to the engine. For example, the encryption engine may include multiple parallel encryption cores where the number of active encryption cores is selected to match the width of the bus. That is, the encryption engine may include four encryption cores, but if the bus transmits only two data blocks at a time, the encryption engine may activate only two of the encryption cores.

At block 410, the encryption engine activates a portion of the scalable tweak engine using the control signal. In one embodiment, the tweak engine includes activation circuitry for deactivating parts of the tweak engine in response to the control signal. For example, if the control signal indicates that four data blocks are transmitted at a time on the bus, the activating circuitry ensures that the entire tweak engine 125 illustrated in FIG. 2 is active. However, if only two data blocks are transmitted at a time, the activation engine activates the tweak calculator 215A-B (e.g., a subportion of the total number of tweak calculators in the tweak engine) and the registers 220A and 220B while the tweak calculators 215C-N and the registers 220C-N are unused.

At block 415, which is an optional step, the activation circuitry deactivates the remaining portion of the scalable tweak engine. That is, if the data bus width is four data blocks wide (and the tweak engine has the arrangement shown in FIG. 2). there would be no deactivated portion of the tweak engine. However, if the data bus width is one or two data blocks wide, some portions of the tweak engine can be deactivated (e.g., bypassed or unpowered).

At block 420, the encryption engine determines whether an updated control signal is received that indicates a change to the number of data blocks being transmitted in parallel on the data bus. If so, the method repeats blocks 410 and 415. That is, the tweak engine can be scaled dynamically as the number of data blocks being received changes.

FIGS. 5, 6, 7A and 7B correspond to prefetching tweak values. The following embodiments can be used in tandem with the embodiments discussed above in FIGS. 1-4 which describe a scalable tweak engine. However, the tweak engine described in the embodiments below is not reliant on using a scalable tweak engine. That is, prefetching tweak values can be performed using scalable and non-scalable tweak engines.

Figure 5:
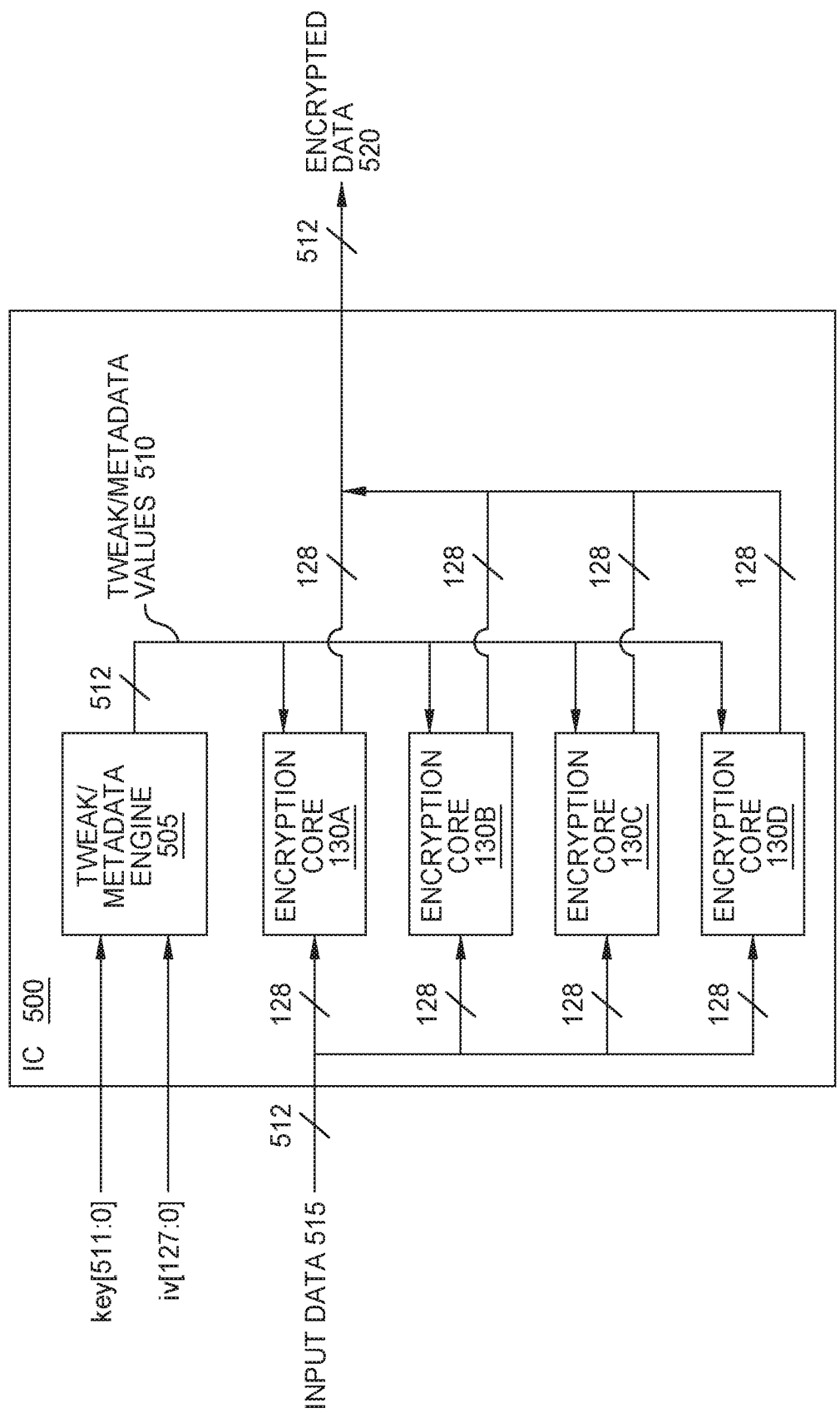
FIG. 5 is a block diagram of an integrated circuit that prefetches tweak values, according to an example.

FIG. 5 is a block diagram of an IC 500 that prefetches tweak values, according to an example. The IC 500 includes a tweak/metadata engine 505 and multiple encryption cores 130A-D. The IC 500 can be any type of IC (like the 105 discussed above). Further, the tweak/metadata engine 505 and the encryption cores 130 can be implemented using PL or hardened circuitry.

In one embodiment, the tweak/metadata engine 505 receives a key and an IV while the encryption cores 130 each receive a 128-bit data block from the input data 515. That is, in this example, a user application can transmit four 128-bit data blocks as input data 515 at the same time. The encryption cores 130 can then encrypt the data blocks in parallel. While the IC 500 illustrates four encryption cores 130, it can include other numbers of cores (e.g., one, two, four, eight, etc.). Moreover, while the embodiment discuss that the IC 500 can include a tweak engine, it can be more generally considered as a metadata engine. Thus, the embodiments in FIG. 5 are not limited to any of the discussion above in FIGS. 1-4 but can be used in encryption systems that do not generate a tweak value, but use any sort of metadata value during encryption.

In one embodiment, tweak/metadata values 510 are calculated before the encryption cores 130 begin to encrypt the data blocks. For example, AES-XTS encryption merges the tweak/metadata values 510 to the data blocks before the data blocks are encrypted by the encryption cores 130. Thus, even if the input data 515 is transmitted at the same time as the key and IV, in current encryption engines, there is a delay while the tweak engine generates the tweak values before the encryption engines can begin to encrypt the received data blocks of the input data 515. Typically, an encryption engine first receives the key (and the IV if it is the first computation cycle), generates the tweak values, and then signals to the user application the encryption engine is ready for the input data 515. Once the input data 515 is received, the encryption engines waits until that data is encrypted before requesting the key for the next set of data blocks. Thus, each time the IC 500 encrypts a set of four data blocks, there is a delay while the tweak/metadata engine 505 uses a new key (and the previous tweak value) to generate tweak/metadata values 510.

However, in the embodiments discussed below, the tweak/metadata engine 505 can prefetch the key so that the tweak/metadata values 510 for the next set of data blocks can be generated while the encryption cores 130 are encrypting the previously received data blocks to generate encrypted data 520. That is, the tweak/metadata engine 505 can prefetch the key and use a previously calculated tweak value to calculate the tweak/metadata values 510 for the next set of data blocks, that have not yet been received. In this manner, the delay associated with calculating the tweak/metadata values 510 can be mitigated or removed entirely (so long as the tweak/metadata engine 505 can finish generating the tweak values for the next data blocks before the encryption cores 130 have completed encrypting the current data blocks).

Figure 6:
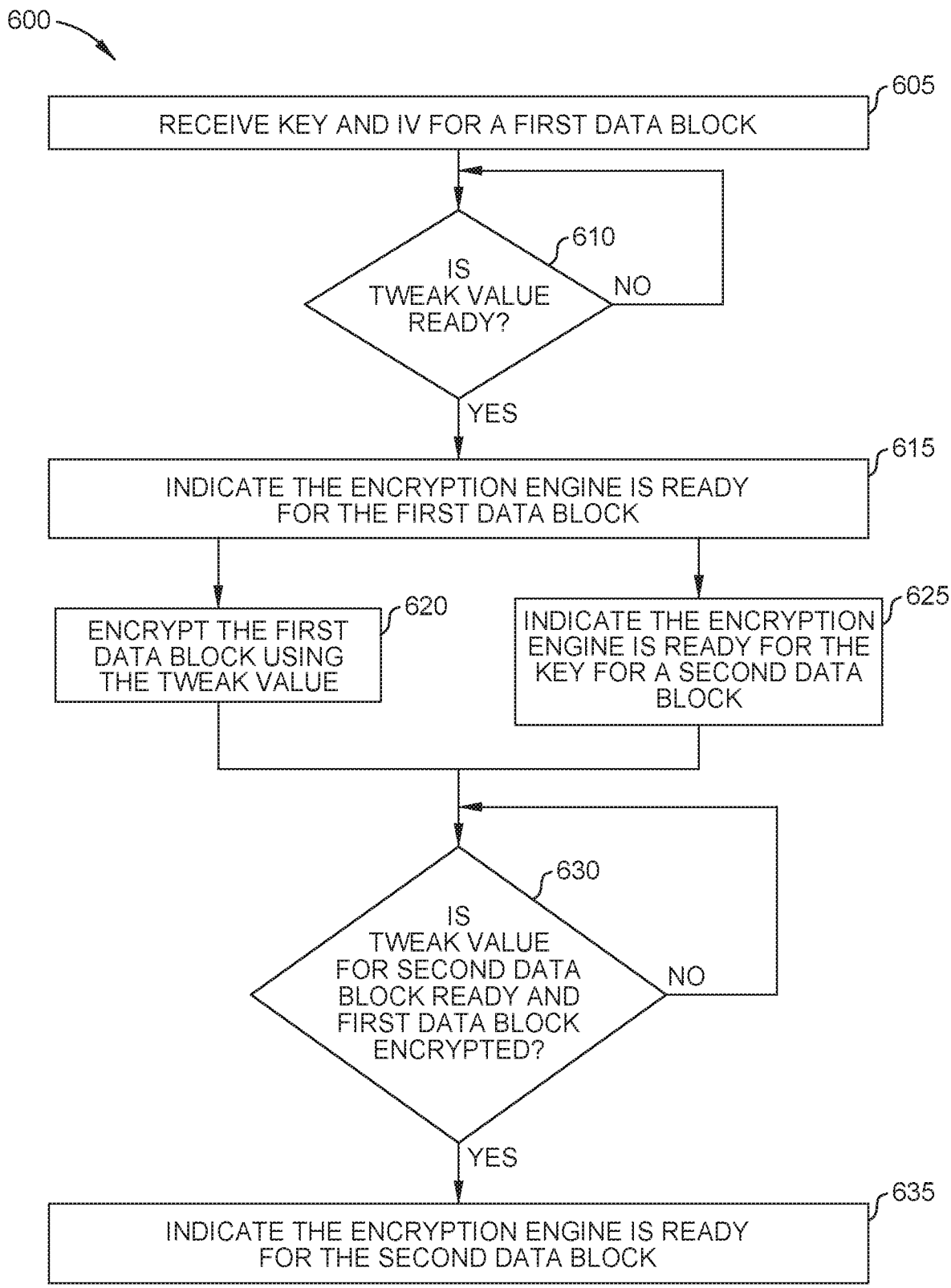
FIG. 6 is a flowchart for prefetching tweak values, according to an example.

FIG. 6 is a flowchart of a method 600 for prefetching tweak values, according to an example. At block 605, the encryption engine receives a key and IV for a first data block. The tweak engine can then calculate the tweak value (or values) for one or more data blocks. At block 610, the encryption engine determines whether the tweak engine has calculated the tweak values. If not, the encryption engines waits, but if it has, the method 600 proceeds to block 615 where the encryption engine indicates it is ready for the first data block (or set of data blocks if the encryption engine receives multiple data blocks in parallel on the bus).

In one embodiment, the encryption engine and the user application perform a handshaking operation where the encryption engine indicates, after generating the tweak value, it is ready to receive the data block corresponding to that tweak value. The user application in turn waits for the indication from the encryption engine and then indicates when it is ready to transmit the data block.

At block 620, the encryption engine receives and encrypts the first data block using the tweak value generated by the tweak engine. In parallel, at block 625, the encryption engine indicates it is ready for the key for a second data block. In one embodiment, the encryption engine waits until it receives the first data block before indicating it is ready to accept the key for the next data block in the encryption task (e.g., the second data block).

The encryption engine and the user application can again perform a handshaking operation to make sure the encryption engine is ready for the next key and the user application has the key available to send. If so, the user application transmits the key for the second data block to the tweak engine. Ideally, the user application transmits the key immediately after the encryption engine indicates it is ready for the key at block 625. In that scenario, the tweak engine has the maximum amount of time to generate the tweak value for the second data block using the key (and the tweak value for the first data block). This increases the likelihood that the tweak value for the second data block will be ready before the encryption core has completed encrypting the first data block, thus eliminating any sort of delay attributable to calculating the tweak value. However, even if the user application cannot send the key for the second data block at the same time the tweak engine is ready to receive it (i.e., there is a delay between when the tweak engine is ready for the key and when the user application is ready to send the key), so long as the user application transmits the key sometime before the encryption engine finishes encrypting the first data block, the tweak engine can calculate the next tweak value in parallel (at least partially) with the encryption core encrypting the first data block. The encryption core may finish encrypting the first data block before the tweak engine has calculated the tweak value for the second data block, in which case there is still a delay attributable to calculating the tweak value, but this delay would be less than if the key was not prefetched. Thus, so long as the user application can provide the key at least sometime before the encryption engine has completed encrypting the first data block, the method 600 provides a performance improvement over encryption engines that do not prefetch the key.

Further, in data center storage and other high-security applications, the keys for all the data units/blocks are often generated in advance and stored within the hardware. Because of this, the keys for subsequent blocks are readily available which is why prefetching the keys as described in the method 600 can result in a significant increase in performance.

At block 630, the encryption engine determines whether the tweak engine has calculated the tweak value for the second data block and the encryption cores has encrypted the first data block. If either of those statements is not true, the method 600 waits before moving on. However, once both are true, the method 600 proceeds to block 635 where the encryption engine indicates it is ready for the second data block.

Although not shown, the method 600 can repeat where, after receiving the second data block, the encryption engine can indicate that it is ready for the key for the third data block. Thus, assuming the user application is ready to send the key to the encryption engine, the tweak engine can calculate the tweak value for the third data block using the key and the previous tweak value while the encryption core encrypts the second data block. In this manner, prefetching the keys for the data block can mitigate the delay attributable to calculating the tweak values.

Figures 7A, 7B:
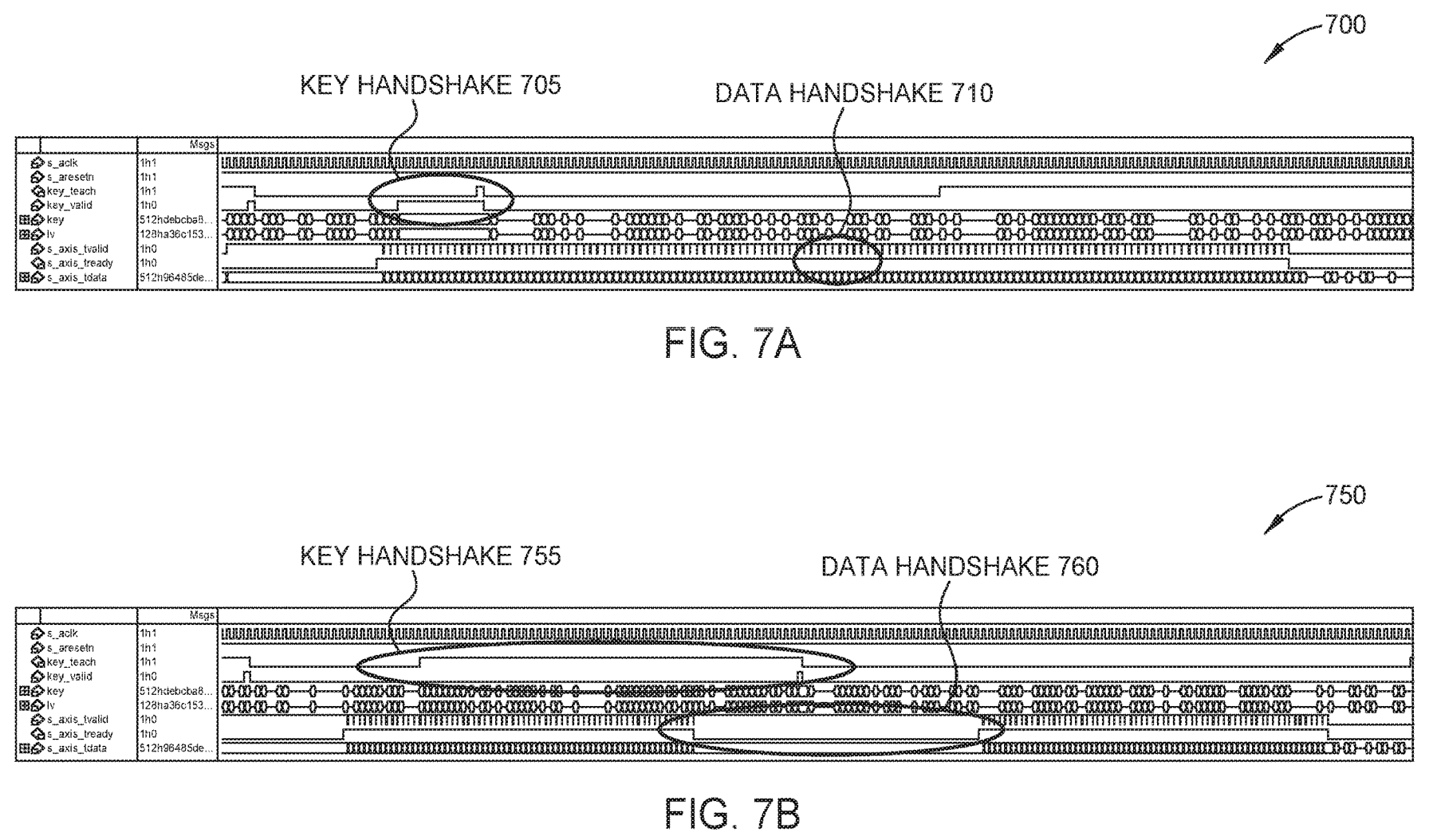

FIGS. 7A and 7B are timing charts illustrating handshakes for prefetching tweak values, according to examples. The timing chart 700 in FIG. 7A illustrates a key handshake 705 and a data handshake 710. As shown, the key handshake 705 is based on the key_fetch signal and the key_valid signal. The key_fetch signal is generated by the encryption engine when the tweak engine is ready to calculate the tweak value for the next data block. In one embodiment, the encryption engine asserts the key_fetch signal after the encryption engine has received the current data block. Advantageously, waiting until receiving the current data block keeps the tweak engine, the encryption core, and the user application synchronized so that the tweak engine does not begin to calculate tweak values for data blocks that are further in the pipeline. For example, the tweak engine would not be able to calculate the tweak engine for the third data block when the user application has only sent the first data block to the encryption engine. Thus, the tweak engine does not get more than one tweak value ahead of the encryption core.

The user application asserts the key_valid signal when it is ready to transmit the next key to the encryption engine. Thus, when both the key_fetch signal and the key_valid signal are high, the key for the next data block is transferred to the encryption engine. In response, the key_valid and the key_fetch signals are de-asserted since neither the encryption engine nor the user application is ready to transfer the key for the next data block.

The data handshake 710 is based on the s_axis_tready signal. In one embodiment, the encryption engine asserts the s_axis_tready signal when it is ready for the next data block. In this example, the encryption engine asserts the s_axis_tready signal if the tweak value for next data block has been completed. Because the tweak engine prefetched the key as shown by the key handshake 705, the tweak engine was able to successfully generate the tweak value before the previous data block was finished being encrypted. As such, the s_axis_tready remains asserted so that the next data block can be transmitted to the encryption engine once the user application also indicates it is ready to transmit the data block.

The chart 750 in FIG. 7B illustrates a scenario where the user application is not ready to transmit the key. That is, due to the internal delay of the user application, the encryption engine is unable to prefetch the key. Like the chart 700, the chart 750 illustrates a key handshake 755 and a data handshake 760. The left of the oval illustrating the key handshake 755 indicates that the key_fetch signal is asserted much earlier than the key_valid signal which is not asserted until near the right of the oval. This indicates that although the encryption engine is ready to prefetch the key for the next data block, for whatever reason, the user application is not ready to send it. As a result, this causes a delay attributable to generating the tweak value.

The data handshake 760 indicates the ramifications of this delay on receiving (and encrypting) the next data block. Unlike in chart 700 where the s_axis_tready signal remained asserted, herein, this signal is de-asserted (as shown in the left side of the oval illustrating the data handshake 760) because the encryption engine has finished encrypting the previous data block but has not yet generated the tweak value for the next data block. Eventually, as shown by the key handshake 755, the user application transmits the key for the next block to the encryption engine (as shown by the key_fetch and the key_valid being asserted at the same time). After a delay caused by the tweak engine calculating the tweak value for the next block, once the tweak value is ready, the encryption engine asserts the s_axis_tready signal indicating to the user application it is ready to receive the next data block. Thus, when the user application delays sending the key for the next block until after the encryption engine has finished encrypting the current data block (i.e., when the encryption engine cannot prefetch the key), the encryption engine experiences the full delay attributable to calculating the key. However, anytime the encryption engine can prefetch the key, this delay is mitigated and performance may increase (so long as there is no delay associated with the user application providing the next data block).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
    a tweak engine configured to generate a tweak value based on an initialization vector (IV), the tweak engine comprising:
        a first tweak calculator configured to generate a first tweak value, wherein an input of the first tweak calculator is configured to selectively receive one of: the IV and an output of a previously calculated tweak value, and
        a second tweak calculator configured to generate a second tweak value, wherein:
            an input of the second tweak calculator is coupled to an output of the first tweak calculator,
            the second tweak calculator receives the first tweak value generated by the first tweak calculator and generates the second tweak value using the first tweak value, and
            the second tweak value is different from the first tweak value;
    a first encryption core configured to receive the first tweak value; and
    a second encryption core configured to receive the second tweak value.

2. The integrated circuit of claim 1, wherein the tweak engine further comprises a multiplexer (mux), wherein the mux is configured to receive as inputs the IV and the previously calculated tweak value and selectively provide one of the IV and the previously calculated tweak value to the first tweak calculator.

3. The integrated circuit of claim 2, wherein an output of the second tweak calculator forms a feedback loop that is coupled to one of the inputs of the mux, wherein the previously calculated tweak value is the second tweak value.

4. The integrated circuit of claim 2, wherein the tweak engine further comprises:
a third tweak calculator coupled to an output of the second tweak calculator and configured to generate a third tweak value based on the second tweak value; and
a fourth tweak calculator coupled to an output of the third tweak calculator and configured to generate a fourth tweak value based on the third tweak value, wherein an output of the fourth tweak calculator forms a feedback loop that is coupled to one of the inputs of the mux, wherein the previously calculated tweak value is the fourth tweak value.

5. The integrated circuit of claim 2, wherein the tweak engine further comprises: a first register disposed between the mux and the input of the first tweak calculator,
a second register coupled to the output of the first tweak calculator and is configured to store the first tweak value, wherein an output of the first register is coupled to the first encryption core.

6. The integrated circuit of claim 5, wherein there is no storage element stored between the output of the first tweak calculator and input of the second tweak calculator.

7. The integrated circuit of claim 1, wherein the tweak engine is implemented in programmable logic in the integrated circuit.

8. The integrated circuit of claim 1, wherein the tweak engine is formed from hardened circuitry, wherein the tweak engine comprises:
activation circuitry for deactivating parts of the tweak engine in response to a control signal.

9. A method, comprising:
receiving a signal indicating a width of a data bus transmitting data to an encryption engine, wherein the width of the data bus corresponds to a number of data blocks transmitted in parallel by the data bus to the encryption engine;
selecting a number of tweak calculators in a tweak engine in the encryption engine based on the signal, wherein the selected number of tweak calculators is based on the width of the data bus; and
generating tweak values using the tweak calculators for encrypting data received on the data bus.

10. The method of claim 9, wherein the tweak calculators comprises:
a first tweak calculator configured to generate a first tweak value, wherein an input of the first tweak calculator is configured to selectively receive one of: an IV and an output of a previously calculated tweak value; and
a second tweak calculator configured to generate a second tweak value, wherein an input of the second tweak calculator is coupled to an output of the first tweak calculator.

11. The method of claim 9, wherein determining the number of tweak calculators in the tweak engine in the encryption engine comprises:
selecting the number of tweak calculators to implement in programmable logic, wherein the number of tweak calculators corresponds to the number of data blocks transmitted by the data bus.

12. The method of claim 11, further comprising:
receiving an updated signal indicating the width of the data bus has changed; and
selecting a different number of tweak calculators to implement in the programmable logic.

13. The method of claim 9, wherein determining the number of tweak calculators in the tweak engine in the encryption engine comprises:
activating a subportion of a total number of tweak calculators in an integrated circuit, wherein the subportion is the number of tweak calculators.

14. The method of claim 13, wherein determining the number of tweak calculators in the tweak engine in the encryption engine comprises:
deactivating a remaining portion of the total number of tweak calculators in the integrated circuit.

15. An integrated circuit, comprising:
a metadata engine configured to generate metadata values for encrypting received data blocks; and
an encryption core configured to encrypt the received data blocks using the metadata values by:
transmitting a first signal to the metadata engine, indicating the encryption core is ready for encrypting a first data block;
receiving a first metadata value corresponding to the first data block;
encrypting the first data block using the first metadata value; and
before the encryption of the first data block has finished, transmitting a second signal to the metadata engine, indicating the encryption core is ready for receiving a second metadata value for a second data block,
wherein the metadata engine is configured to pre-fetch a key corresponding to a second data block by:
upon receiving the first signal, generating the first metadata value corresponding to the first data block;
upon receiving the second signal, receiving the key for the second data block; and
generating the second metadata value for the second data block using the key for the second data block, in parallel with the encryption core encrypting the first data block.

16. The integrated circuit of claim 15, wherein the metadata engine generates the second metadata value before the encryption core has finished encrypting the first data block.

17. The integrated circuit of claim 15, wherein the metadata engine begins a process to generate the second metadata value while the encryption core encrypts the first data block but finishes generating the second metadata value after the encryption core encrypts the first data block.

18. The integrated circuit of claim 15, further comprising:
an encryption engine comprising the metadata engine and the encryption core, wherein the encryption engine is configured to indicate the encryption core is ready for the second data block after determining that the second metadata value is generated and the encryption core has finished encrypting the first data block.

19. The integrated circuit of claim 15, wherein the metadata engine is configured to indicate it is ready to receive the key corresponding to the second data block after determining the encryption core received the first data block.

20. The integrated circuit of claim 15, wherein the metadata engine is configured to generate the second metadata value for encrypting the second data block, which has not yet been received at the encryption core, in parallel with the encryption core encrypting the first data block, wherein the encryption core is configured to encrypt the second data block after the second metadata value is generated.

* * * * *